United States Patent [19]

West

[11] 4,166,505

[45] Sep. 4, 1979

[54] METHOD AND APPARATUS FOR HARVESTING GREEN PEANUTS

[76] Inventor: Frederick P. West, Rte. #1, Dawson, Ga. 31742

[21] Appl. No.: 768,154

[22] Filed: Feb. 14, 1977

[51] Int. Cl.² ............................................. A01D 91/02
[52] U.S. Cl. .......................................... 171/1; 171/41; 56/13.3
[58] Field of Search ............... 171/1, 101, 41, DIG. 1; 56/1.58, 30, 12.8, 13.3; 209/241

[56] References Cited

U.S. PATENT DOCUMENTS

| | | | |
|---|---|---|---|
| 1,288,541 | 12/1918 | Fant | 171/44 |
| 3,881,226 | 5/1975 | Kent et al. | 56/30 X |
| 3,959,956 | 6/1976 | Fowler | 56/30 |

*Primary Examiner*—Russell R. Kinsey
*Attorney, Agent, or Firm*—Newton, Hopkins & Ormsby

[57] ABSTRACT

A method and apparatus for harvesting green peanuts comprising severing the peanut foliage from the peanuts which remain implanted in the ground by means of a vine cutting apparatus and plowing up the green peanuts and cleaning them by means of a novel combine. The vine cutting apparatus comprises a wheeled vehicle which is towed behind a tractor and has a transversely extending, ground engaging reciprocating cutter which severs the foliage, a conveyor which upwardly transports the foliage to be directed by a blower means through a chute into a container pulled behind the apparatus. The combine uproots the peanut pods by means of a single, transverse digger blade, upwardly conveys them and shakes the dirt therefrom and dumps the peanuts into the main body of the combine where the dirt is removed, the stems are severed from peanuts, and the peanuts are stored.

5 Claims, 7 Drawing Figures

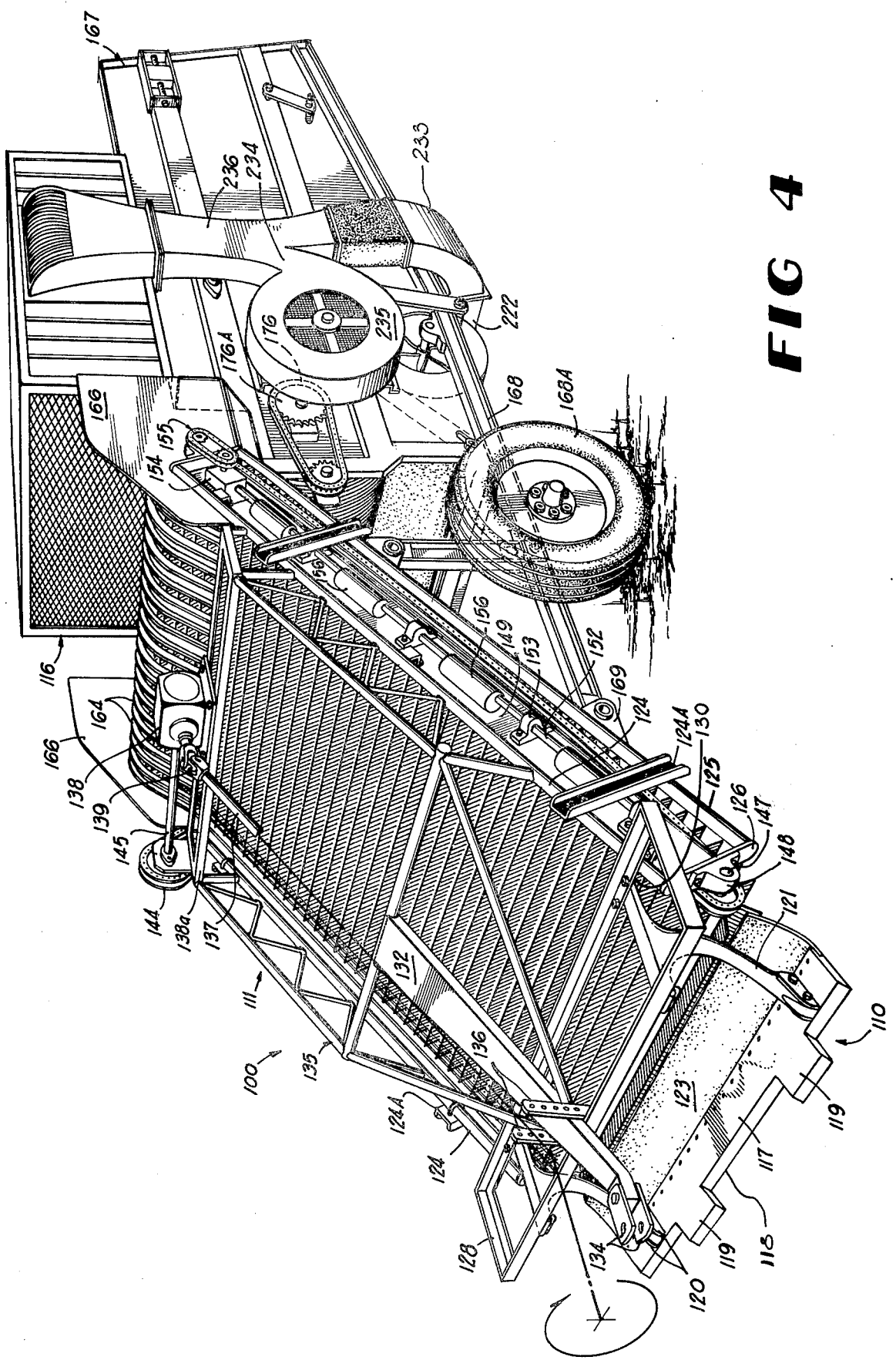

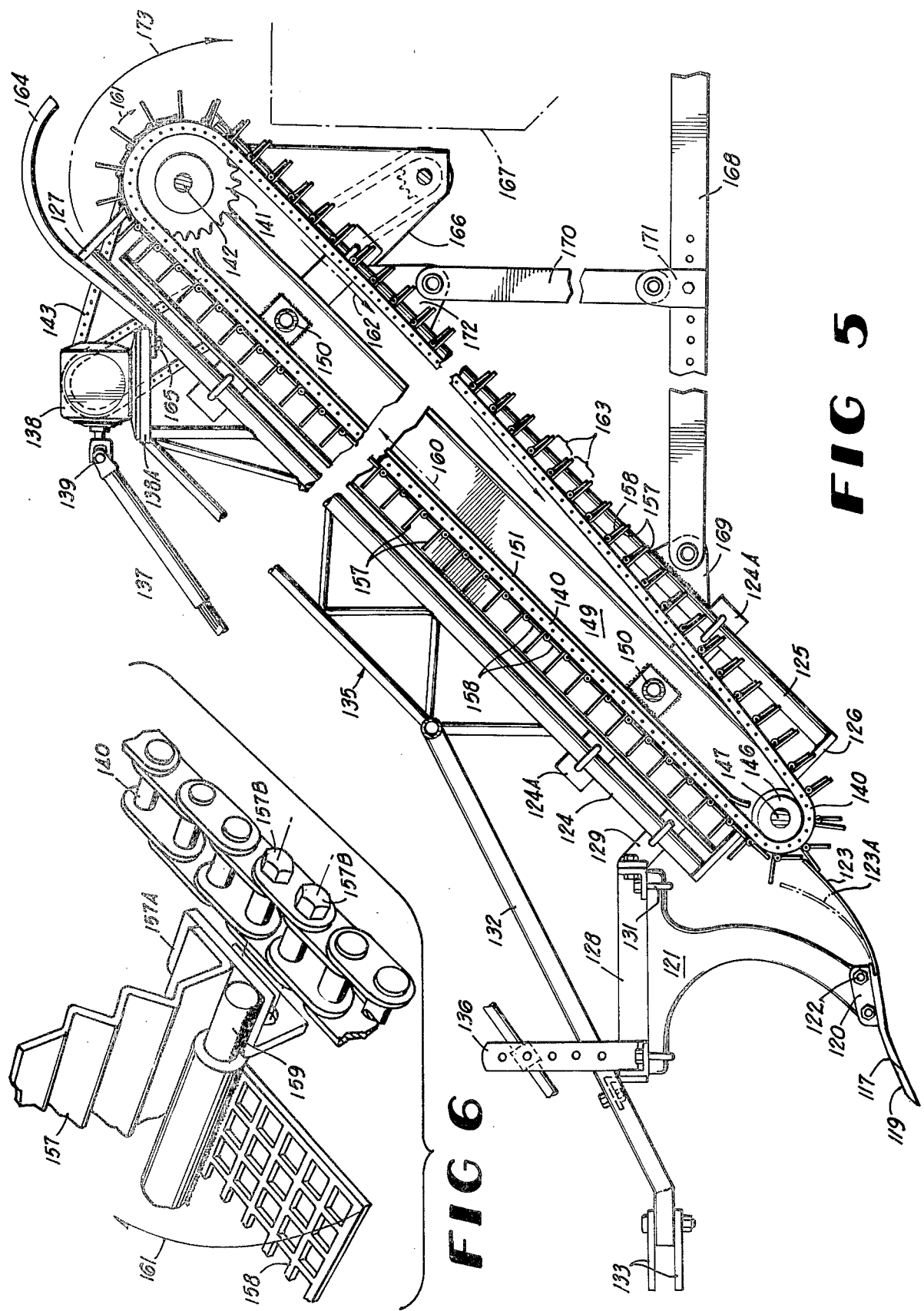

METHOD AND APPARATUS FOR HARVESTING GREEN PEANUTS

BACKGROUND OF THE INVENTION

In harvesting peanuts, the common procedure is to dig the peanuts up from the earth, convey the plants in an upwardly direction while simultaneously shaking the dirt therefrom and windrow or invert the plants for drying. The peanut plants comprise vines having peanuts attached thereto. Machines for accomplishing that type of peanut harvesting are called digger-shaker-windrowers or digger-shaker-inverters and usually comprise a plow that is pulled by a tractor beneath two adjacent peanut rows to uproot the plants and convey them to an inclined conveyor which elevates the plants. The plants are then allowed to fall from the upper end of the conveyor onto the ground, usually with the two adjacent rows of plants forming a windrow. If an inverter is utilized, the peanuts are oriented on the ground in a nuts-up attitude whereby they can be dried much easier and more quickly than in a random orientation of the nuts. Such inverters are exemplified by U.S. Pat. No. 3,726,345, issued Apr. 10, 1973 to Harrell et al; and U.S. Pat. No. 3,734,194, issued May 22, 1973 to Whitfield.

After the nuts have been suitably dried, peanut combine machines are utilized to gather the peanut vines with the peanuts attached from the ground or windrows by a pickup means to separate the peanuts from the vines to which they are attached, to remove the stems from the peanuts, clean the peanuts and to discharge the peanuts into suitable containers. Typical combines are shown in U.S. Pat. No. 3,007,475, issued Nov. 7, 1961 to Long; and U.S. Pat. No. 3,404,517, issued Oct. 8, 1968 to Whitfield, et al.

The above described peanut process is expensive, time consuming and cumbersome in its utilization of a separate harvesting step allowing the peanuts to dry and then a separate combining step.

Additionally, the windrowing of the peanuts subjects them to rainfall which may cause undersirable mold growth or a total loss of the crop, birds and rodents often destroy part of the crop and the conventional combines frequently cause breaks and splits and allow easy access for mold and insect infestation.

In a paper entitled "Mechanisms for Picking Peanuts from Oriented Plants" by J. L. Butler, et al. for presentation at the Annual Meeting, American Peanut Research and Education Association, San Antonio, Texas, July 12–15, 1970, and published in the Journal, mechanisms were disclosed which picked freshly dug or "green" oriented peanuts and separated the vines from the peanut pods. The Butler et al. paper stated that directing the plants into a picking component immediately behind a digging component would help to eliminate having some peanuts become entangled with the vine mass.

SUMMARY OF THE INVENTION

The above disadvantages are overcome by the present invention which comprises a peanut vine cutting apparatus which proceeds along the ground over at least two adjacent rows of peanut plants, severs the vines from the peanuts and removes the severed vines to a suitable storage means; and a green peanut combine which then harvests the green peanuts by digging them up, upwardly conveying the peanuts, dumping the peanuts into the main body of the combine wherein the dirt and peanut stems are removed from the peanuts and they are discharged into a suitable container. The term "green peanuts" as utilized herein means harvested peanuts which have not been dried.

The vine cutter comprises a wheeled frame which is capable of being towed behind a tractor or the like. The forward end of the frame is provided with a transversely disposed reciprocating cutting assembly which travels at ground level through the peanut rows and severs the vines from the peanuts. An upwardly inclined conveyor is positioned adjacent and to the rear of the cutter assembly to receive the severed vines. A blower is disposed over the conveyor to direct through a blast of air the vines into a container which is connected to the rear of the vine clipper. The severed vines can then be processed into suitable silage. Thus, the present invention utilizes the peanut vines whereas prior art harvesting methods usually discarded the dried vines once the nuts had been picked therefrom.

Applicant's peanut combine is then pulled along and over the rows of peanuts which have had their vines previously severed by the above-described vine clipper. The combine is mounted on a wheeled frame which has its forward end attached to the rear of a tractor. A single plow blade having a beveled forward edge is transversely mounted on the combine for digging the peanuts up from at least two adjacent rows, the blade having two longitudinally extending projections spaced on its forward edge, each of which pass directly beneath the peanut rows to dig the peanuts from the ground.

A shaker or inclined conveyor is positioned behind the plows to receive the peanuts from the digger blade and elevate them while shaking the dirt from them. The conveyor comprises a plurality of spaced, laterally extending, substantially parallel, upstanding plates which are connected at their ends to a continuous driving mechanism. The plates are arranged in an upper upwardly inclined flight extending from the rear of the plow up toward the peanut dumping area of the conveyor and a lower return flight movable in a return direction from the dumping area back toward the plow. A plurality of dirt screens are hingedly mounted on the conveyor between adjacent upstanding plates along the bottom of the forward sides of the plates with reference to the upper flight. As the upper flight moves, the screens are in their operative position so as to form substantially a 90° angle with their respective plates. At the top of the conveyor, the screens begin to move upwardly toward their respective plates due to the force of gravity, thereby dumping the peanuts into the main body of the combine; the bottom flight has the screens contacting the respective plates so as to leave an empty space between the plates of the bottom flight. In this manner, the peanuts and dirt are carried upwardly on the upper flight, with the dirt falling through the screens on the upper flight and the spaces between the plates on the lower flight to the ground.

The conveyor is continuously jarred by means of shafts arranged on both sides of the conveyor. The shafts are operable to rotate about their axes and have eccentrically mounted weights spaced therealong so as to impart side-to-side and up-and-down movement to the conveyor.

The peanuts are dumped from the upper end of the conveyor into the picking section which comprises a picking cylinder which has a plurality of spring teeth spaced about its outer periphery which engage spring teeth upwardly disposed through a concave, perforated screen positioned beneath the cylinder, the cylinder and screen cooperating to break up the dirt clumps and pick the peanuts therefrom. Adjacent and to the rear of the picking cylinder is the picking rake which comprises a continuous chain arrangement having a plurality of staggered upstanding spring teeth spaced about its periphery, the picking rake being powered to move in a longitudinal direction to comb peanuts from the picking cylinder. A rake bed is positioned beneath the picking rake and comprises a plurality of overlying, spaced, longitudinally and laterally extending concrete reinforcing rods which cooperate with the teeth on the picking rake to further separate the peanuts from the accompanying trash.

A shaking section is disposed beneath the concave screen and the rake bed and comprises an upper shaker bed which is reciprocally mounted to clean the peanuts of dirt adhereing to them. The nuts fall through a screen into the bottom shaker bed which is also reciprocally movable. A cleaning fan drives a current of air through the cleaning section to dislodge lighter trash elements out the open rear of the combine.

The nuts then pass through the stemming section to cut the stems from the peanuts as they pass between the stemmer saws. After passing the stemmers, the nuts fall into a collection duct where they are blown up into a collection bin that is on top of the combine.

It is, therefore, a primary object of the present invention to provide for a new, improved method and apparatus for harvesting green peanuts.

Another object of the present invention is to provide for a machine which will cut the vines from peanut plants and remove the severed vines from the rows.

Another object of the present invention is to provide for a combine that can dig up, pick, clean and store green peanuts, which have previously had their vines severed therefrom.

A further object of the present invention is to provide a method of harvesting peanuts which eliminates the need for drying the peanuts in windrows.

Another object of the present invention is to provide for cleaner peanuts than obtained by conventional means in view of the elimination of the peanut drying step so that the peanuts are not bound together in dried dirt clods.

A still further object of the present invention is to provide a novel peanut shaker or conveyor.

BRIEF DESCRIPTION OF THE FIGURES OF DRAWINGS

FIG. 4 is a perspective view of the peanut combine of the present invention;

FIG. 5 is a side elevational view of the digger and conveyor portion of the peanut combine of the present invention;

FIG. 6 is a detailed, partially exploded perspective view of the peanut conveying apparatus of the combine.

DESCRIPTION OF AN EMBODIMENT

I. Peanut Vine Cutting Apparatus

Figure 1:
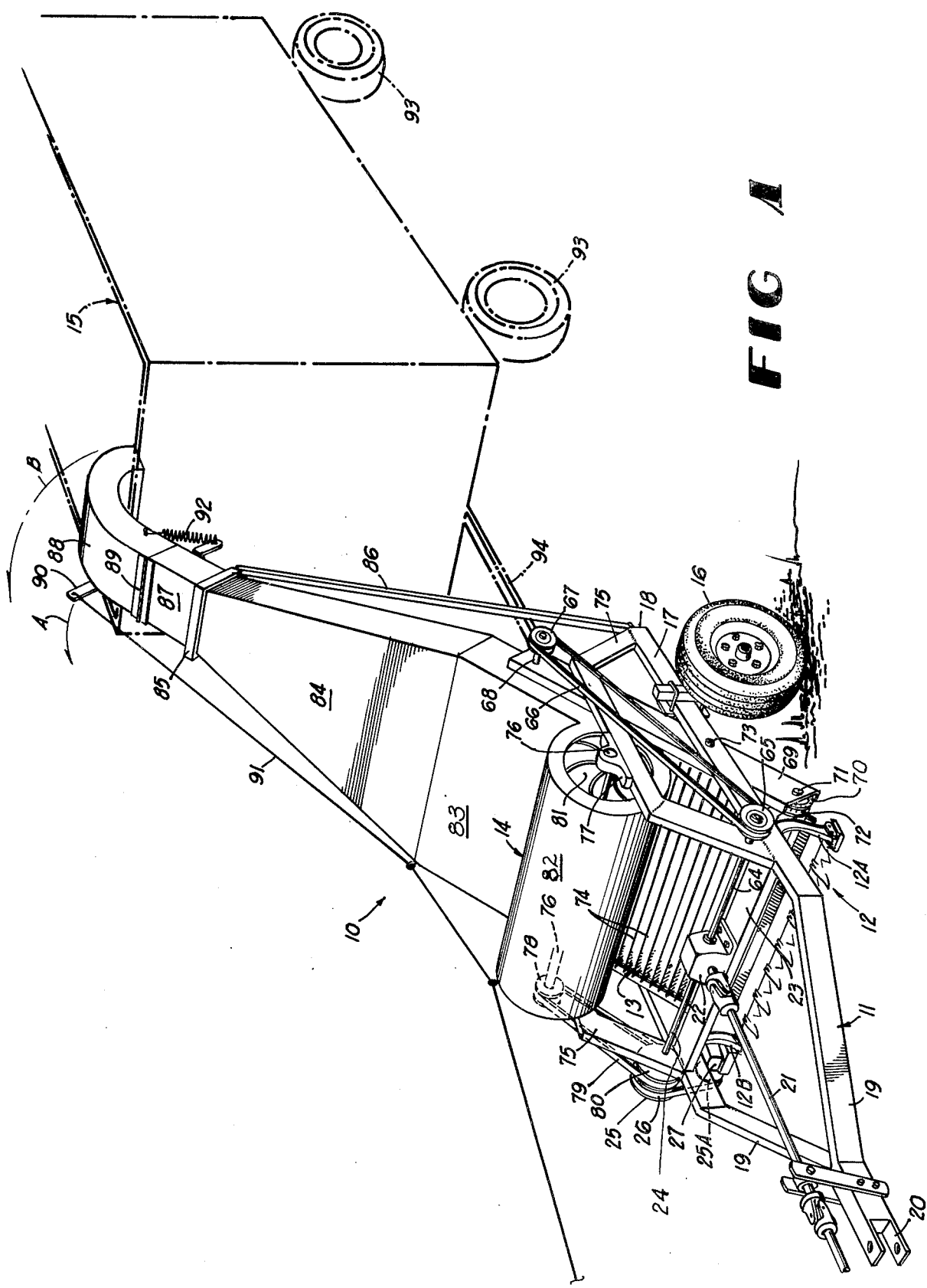
FIG. 1 is a perspective view of the peanut vine cutting apparatus of the present invention.

Referring to FIG. 1, the numeral 10 designates generally the vine cutting apparatus of the present invention and comprises a wheeled frame 11, a reciprocating cutting assembly 12, conveyor 13, blowing means 14 and severed vine storage container 15.

The frame 11 is supported above the ground by a pair of wheels 16 mounted from the side elements 17 near the rear end 18 of the frame 11. The forward ends of sides 17 terminate in inwardly diverging frame elements 19 which terminate in the tractor hitch 20 by which the frame 11 is towed by the tractor (not shown). A conventional power take off shaft 21 which extends from the rear of the tractor is connected through conventional universal drive means to a gear box 22 mounted on a transverse, horizontal gear box support brace 23 which is supported at both of its ends on the side elements 17. An output shaft 24 extends from the left side of the gear box 22 and has connected at its outer end a drive pulley 25. A drive belt 26 is connected to the pulley 25 and idler pulley 25A which is mounted on a rotatable shaft (not shown) which extends from the cutting gear drive mechanism 27 which powers the reciprocating cutting assembly 12.

Figure 2:
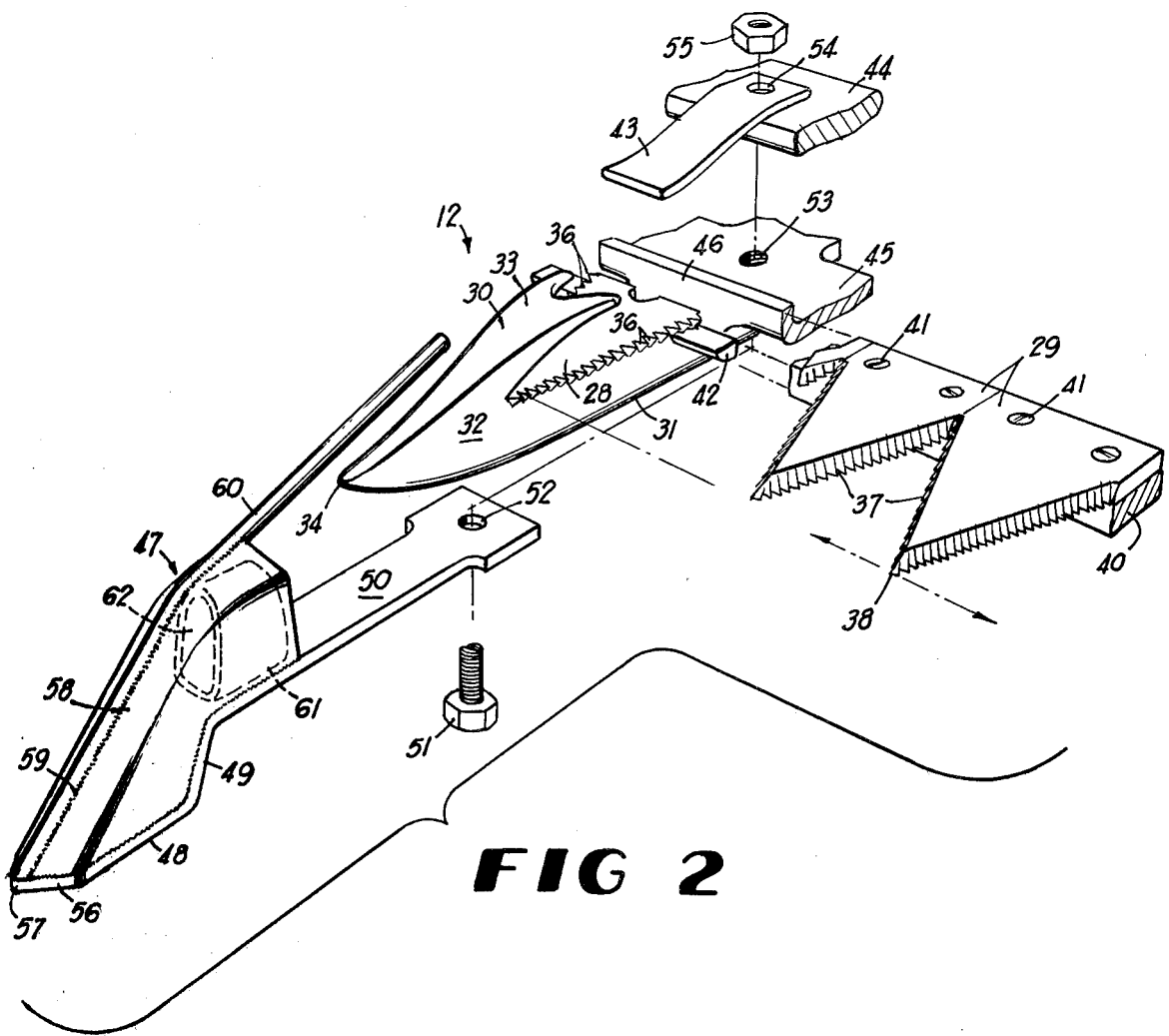
FIG. 2 is a detailed, exploded perspective view of the vine lifting and cutting assembly.

The assembly 12 is mounted in the forward section of frame 11 adjacent the ground between shanks 12A, 12B which depend from side elements 17. The assembly 12, as shown more in detail in FIGS. 2 and 3, includes a conventional reciprocating cutter comprising a plurality of stationery horizontally disposed ledger blades 28 having flat top surfaces and juxtaposed, transversely movable, horizontal, parallel blades 29 disposed to slidably move over the top surfaces of blades 28. The blade arrangement is as found on large grass mowers and the like. Each ledger blade 28 is situated on a longitudinally projecting guard finger 30 having a flat bottom 31 which, along with contoured sides 32 and top 33, terminate in forward point 34. The ledger blade 28 is mounted below top 33 and on the top of the lower portion of the guard finger 30 so that the saw-tooth edges 36 diverge outwardly from the sides 32. The guard fingers 30 are horizontally spaced across the front of the vine cutting apparatus 10.

Figure 3:
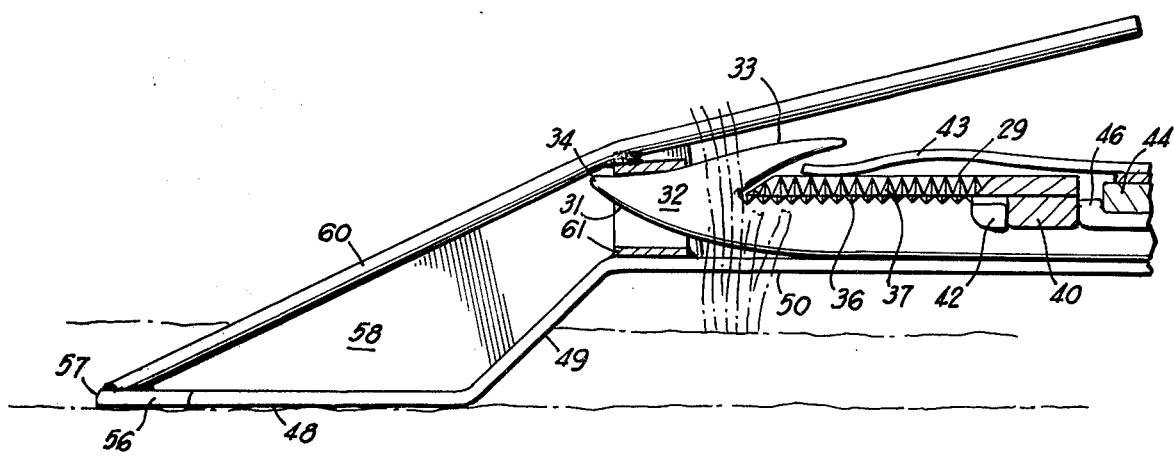
FIG. 3 is a side elevational view of the vine lifting and cutting assembly.

The movable blades 29 have tapering saw-toothed edged sides 37 which terminate in forward point 38 and are secured across their rear portions to an elongated rectangular-shaped sliding element 40 by means of screws 41. Referring to FIG. 3, it can be seen that sliding element 40 rests on the top surface of an open recess formed in the rear of guard finger 30 with the lower surfaces of movable blades 29 overlying the top surfaces of ledger blades 28. An integral member 42 on each guard finger 30 is transversely positioned to define the front of the open recess and engages the forward edge of sliding element 40. The element 40 and blades 29 are operably connected to the cutting gear drive mechanism 27 for transverse, reciprocal movement.

The movable blades 29 are maintained in their position overlying stationary blades 28 by means of a plurality of spring clips 43 which are secured adjacent their rear ends to a plate 44 that is positioned on top of an L-shaped mounting element 45 which has an upwardly projecting vertical front wall 46. The sliding element 40 moves between spacer 42 and front wall 46.

A vine lift attachment 47 is provided for the cutting assembly 12 and includes a bottom plate dimensioned to comprise a flat forward position 48 which terminates along its rear in a 45° upwardly sloping section 49 which terminates in horizontal rear section 50. The attachment 47 is mounted on the assembly 12 by means of a threaded bolt 51 which projects through opening 52 in section 50, opening 53 vertically disposed through mounting element 45 and opening 54 disposed through clip 43, the bolt 51 being secured about its top by means of complimentarily threaded nut 55. When the attachment 47 is secured onto the assembly 12, the bottom 31 engages the top surface of section 50.

The forward end of portion 48 terminates in inwardly directed section 56 which terminates in forward point 57. An outer covering 58 is secured to the edges of the bottom plate and has an upwardly projecting forward surface 59. A tine 60 is welded to the top of covering 58 and upwardly extends over the cutting assembly 12 to aid in directing the peanut plants into engagement with the blades 28, 29. A metal ring 61 is positioned within the attachment 47 at the forward area of section 50, the ring 61 having an opening 62 therethrough which is complimentary in shape to the forward projecting portion of blade mount 30. When the attachment 47 is mounted on the assembly 12, the mount 30 extends through the opening 62, as seen in FIG. 3, so as to prevent transverse movement of the attachment 47 on the mount 30.

As seen in FIG 1, the vine cutting apparatus 10 further comprises a conveyor mechanism 13 which is operatively associated with the rear of the cutting assembly 12 for engaging the severed peanut vines and conveying the vines upwardly. The conveyor mechanism 13 is powered by means of output shaft 64 which extends from the right side of gear box 22. A conventional pulley 65 is secured to the end of shaft 64 with the drive from pulley 65 being delivered by means of a conventional belt 66 to a pulley 67 which is mounted on the end of rotatable shaft 68 which extends outwardly from the upper end of conveyor side channel member 69 and across to be journaled in the conveyor side channel member (not shown) on the other side of the conveyor 13. A drive sprocket (not shown) is secured to the shaft 68 within the channel member 69. A sprocket 70 is fixed to rotatable shaft 71 which is mounted at the lower end of channel member 69 and transversely extends to be journaled within the other conveyor side channel member. An endless chain 72 extends around sprocket 70 and the sprocket on shaft 68. A second endless chain is suitably mounted on the left side of the conveyor mechanism 13. The conveyor side channel member 69 is connected to side 17 in an upwardly directed attitude by means of bolt 73.

The conveyor mechanism 13 includes a plurality of conventional conveyor cross support bars 74 which are secured at their opposite ends to the endless chains 72 and which are linearly spaced around the length of the chains 72 to provide a support surface for the severed peanut vines.

The blowing means 14 is supported above the conveyor mechanism 13 by means of sub-frame 75 which is connected to the top of the side elements 17 and includes a rotable blower shaft 76 which extends through a bearing support 77 mounted on the top of sub-frame 75. An idler pulley 78 is mounted on the other end of blower shaft 76. A belt 79 extends around pulley 78 and drive pulley 80 mounted on drive shaft 24. A plurality of blower vanes 81 are spaced about the outer periphery of blower shaft 76 and are enclosed within blower housing 82. A rectangular-shaped discharge conduit 83 extends from the rear of housing 82 and communicates with inwardly tapering chute section 84. The bottom of discharge conduit 83 is open and overlies the upper end of conveyor mechanism 13. The section 84 has a closed bottom. The chute section 84 is supported in its upwardly inclined position by means of a metal collar 85 which extends about the rear edge of section 84. Frame elements 86 are secured to collar 85 and the rear ends of side elements 17 adjacent end 18.

Section 84 is in communication with narrow, rectangular-shaped chute section 87 which, in turn, is in communication with curved neck section 88 which projects into the top of container 15. The section 88 is connected to section 87 along hinge element 89. An upwardly extending lever 90 is pivotally secured to the side of section 88 and has a cable 91 connected thereto which is connected to a manually operable lever (not shown) mounted on the tractor. The section 88 is tensioned to return to its operable position by means of spring 92. Operation of lever 90 along arrow A causes the neck 88 to upwardly pivot about hinge 89 along arrow B.

The vine storage container 15 is supported above the ground by wheels 93 and is pulled behind frame 11 by means of connecting bar 94 which is releasably secured to the back of frame 11.

II. Operation of Peanut Vine Cutting Apparatus

In its operation, the apparatus 10 is connected to a tractor by framework connecting pins being secured within hitch 20 and the power take off shaft 21 is connected to the tractor vehicle to effect operation of the cutting assembly 12, conveyor 13 and blowing means 14 through the above-described respective drive linkage.

The apparatus 10 is moved into position straddling at least a pair of adjacent rows of implanted peanuts. The frame 11 is adjusted so that the bottom of portion 48 engages the top of the ground. The apparatus 10 does not require the utilization of a conventional colter disc to sever the vines between adjacent rows. The tractor is then advanced longitudinally along the rows.

Forward movement of the tractor causes the vine lift attachment 47 to lift the peanut vines off the ground and into engagement with the blades 28, 29. The vines flow over covering 58 and tine 60 where they are severed from the peanuts by the reciprocating cutters.

A continued movement of the tractor elevates the severed peanut vines or foliage above the ground and into engagement with the support bars 74 on the conveyor mechanism 63. The conveyor mechanism 63 advances the peanuts upwardly underneath the blowing means 14 where the rotating vanes 81 force a current of air through sections 83, 84, 87 and 88. Since the bottom of section 83 is open and is directly over the upper end of conveying mechanism 63, the foliage is drawn into section 83 by venturi action and is driven upwardly through sections 84, 87 and 88 into container 15.

When the container 15 is full, the driver of the tractor stops the tractor and pulls on cable 91 which moves lever 90 along path A which, in turn, causes neck 88 to move along path B out of engagement with the top of the container 15. The bar 94 is disconnected from frame 11 and is moved to a suitable location. Another container 15 may be placed into position and the vine cutting process may continue.

III. Green Peanut Combine

Figure 7:
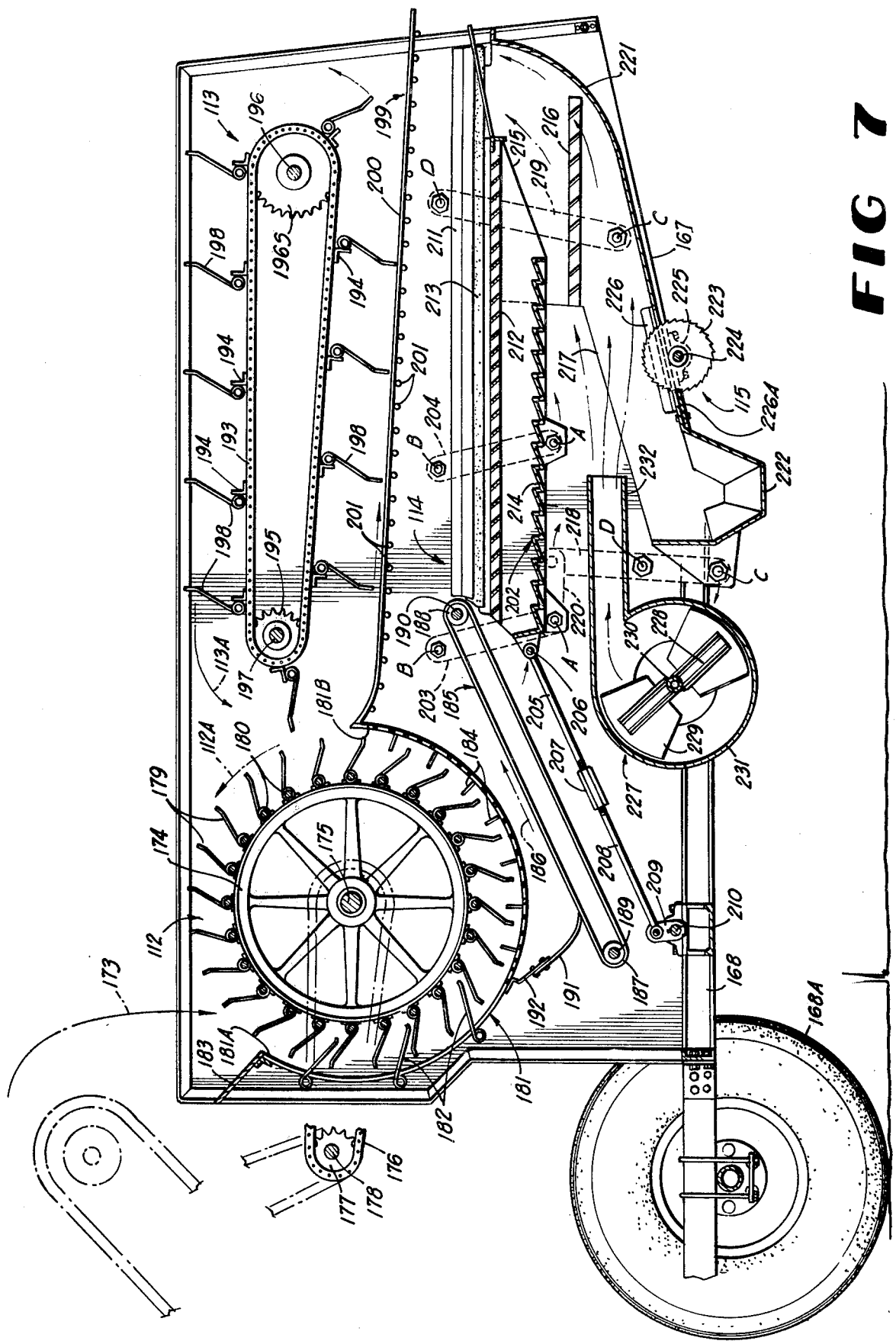
FIG. 7 is a side cross-sectional view of the main body of the combine.

After the above-described vine cutting apparatus 10 passes over the peanut rows and severs and removes the peanut foliage, all that remains above ground are the individual peanut stems which are connected to the peanut pods remaining underground. A green peanut combine 100 is then passed over the peanut rows. Referring to FIGS. 4 and 7, the combine 100 comprises a digger 110, shaker or conveyor 111, and a main combine body housing the picking section 112, raking section 113, shaker section 114, stemmer saws 115 and collection chamber 116.

A. Digger

The digger 110 is shown in FIGS. 4 and 5 and comprises a single plow blade 117 which transversely extends across the front of the combine 100. The forward edge 118 is beveled and includes a pair of spaced, longitudinally extending projections 119 which are generally one foot in width. The projections 119 are positioned to pass directly underneath the peanut rows. As seen in FIG. 5, the blade 117 is inclined upward from edge 118 to its rear to direct the peanuts upward from their glowing implacement within the ground. Spaced, upstanding brackets 120 are provided adjacent each end of plow blade 117 to connect the blade 117 to the bottom of shanks 121 by means of nut and bolt arrangement 122. An upwardly inclined flexible belting 123 is secured across the rear edge of plow blade 117 to guide the dirt and uprooted peanuts onto the conveyor 111, as described in detail hereinbelow.

B. Conveyor

The conveyor 111 comprises a tubular subframe including spaced upper and lower tubular elements 124 and 125 which are secured together at their ends by lower plate 126 and upper plate 127. Upstanding bracket support members 124A are secured to tubular elements 124, 125 to add rigidity thereto. The upper tubular elements 124 are secured to a rectangular mounting frame 128 by means of brackets 129 which are bolted to frame 128 and connected to upper tubular elements 124 by means of U-bolts 130. As seen in FIG. 4, the upper portions of shank 121 are connected to the frame 128 by means of U-bolts 131. A draft tongue 132 is bolted to frame 128 across its middle, the tongue 132 terminating in horizontal, spaced plates 133 having eyes 134 through which a pin may be inserted to connect the combine 100 with the rear of a tractor. The rear of the tongue 132 is connected to a transverse frame member which is a part of the upper truss frame which is denoted generally by the numeral 135 secured at various points to the top of the upper tubular elements 124. The tongue 132 is also connected by a bolt and nut arrangement to frame 128. Spaced brackets 136 extending upwardly from the forward side of frame 128 to support therebetween the power take off shaft 137 from the tractor to the gear box 138 through the universal joint 139. The gear box 138 is supported above the center of the upper end of the conveyor 111 by means of a horizontally disposed rectangular shaped frame 138A which is attached to the rear of the upper truss frame 135 and the top of the upper tubular elements 124.

The conveyor 111 includes opposed endless chains 140 disposed on opposite sides of the conveyor 111, each chain 140, as shown in detail in FIG. 6, being supported adjacent the upper discharge end of the conveyor 111 by means of a drive sprocket 141 which is fixed to rotatable drive shaft 142 which extends through the left side of the conveyor 111. A sprocket (not shown) is affixed to the outer end of shaft 142 and supports thereon an endless chain 143 similar in construction to chain 140 shown in FIG. 6, which is also supported for endless travel on sprocket 144. The sprocket 144 is secured onto rotatable drive shaft 145 which extends from and is operably connected to the gear box 138.

Each chain 140 is supported adjacent the lower end of the conveyor 111 by means of a sprocket 146 which is fixed to rotatable shaft 147 which is supported at each of its ends in bearing blocks 148 that are affixed to lower plates 126.

Disposed between upper and lower tubular elements 124, 125 is a shaker frame assembly comprising longitudinally extending channel members 149. The channel members 149 are interconnected by means of tubular, transverse frame supports 150. The bottom of the upper flight of the chains 140 engages the top surface of upper flange 151 of channel members 149. Referring to FIG. 4, it can be seen that a rotatable shaft 152 is centrally disposed along the channel member 149 through a plurality of spaced bearing mounts 153 and has its upper end connected to a bevel gear box 154 which is operably connected through suitable sprocket and chain arrangement, including the assembly denoted generally by the numeral 155, to the drive shaft 145. The lower end of shaft 152 is operably connected to a suitable mounting (not shown). Spaced between mounts 153 along the length of shaft 152 are a plurality of eccentrically mounted, cylindrical-shaped shaker weights 156.

Referring to FIG. 6, the conveyor 111 further includes a plurality of spaced, upstanding plates 157 which are secured at their opposite ends to the endless chains 140 by means of brackets 157A mounted on the chain elements by means of bolts 157B. The plates 157 are corrugated along a portion of their height for extra rigidity. Elongated rectangular-shaped perforate dirt screens 158 are hingedly mounted on shafts 159 secured on brackets 157A. The shafts 159 are located adjacent the bottom of the forward side of plates 157 when the plates 157 are viewed in their upward flight along conveyor 111. There is a respective screen 158 disposed between each adjacent pair of plates 157, the distance between adjacent plates 157, being substantially the width of screen 158. Along the upper flight of the conveyor 111 in the direction as shown by arrow 160 in FIG. 5, the screens 158 are in their downward operative position in engagement with the top of chains 140, the screens 158 forming a 90° angle with plates 157. As the upper flight reaches the upper discharge end of conveyor 111, the screens 159 begin to pivot about shafts 159 along the direction of arrow 161 due to the pull of gravity. Along the lower flight of the conveyor 111 as shown in the direction of arrow 162, the screens 158 are in their inoperative position with their upper surfaces in contact with the forward side of plates 157, thereby creating a space 163 between respective plates 157.

A plurality of curved deflecting members 164 are laterally spaced across the top of the discharge end of conveyor 111. The bottom end of deflecting members 164 are connected to the underside of frame 138A by means of bolts 165.

Shields 166 are located on opposite sides of the conveyor 111.

The digger 110 and conveyor 111 are detachable as a unit from the main combine for use as a rock and debris collector when utilized with a suitable container that could have its open top disposed beneath the upper discharge end of the conveyor 111. The rock and debris collector could be used to transverse a field prior to planting of crops, including peanuts, to sift through the soil and remove therefrom any rocks or other debris which would interfere with the subsequent operation of the green peanut combine 100.

The digger 110 may be set at a predetermined subterranean depth to turn over the soil and transfer it to the conveyor 111 where the dirt is sifted through screens 158 and falls back to the ground through spaces 163. The rocks, being too large to fall through the holes in screens 158, are carried upwardly on top of the screens 158 whereby, at the upper discharge end of conveyor 111, the rocks and other debris falls into a suitable container to be removed from the field.

The main combine body includes outer housing 167 which is supported along its bottom by longitudinal frame members 168 which are connected to the lower portion of conveyor 111 at mounting brackets 169. The wheel assemblies 168A are operatively connected to frame members 168. Vertical standards 170 interconnect the frame members 168 and the upper end of conveyor 111 by means of brackets 171, 172 respectively.

C. PICKING SECTION

The peanuts having their stems attached fall from the upper discharge end of conveyor 111 into the picking section 112 disposed within the main combine body along the path of arrow 173. The picking section 112 comprises a picking cylinder head 174 mounted on rotatable picking cylinder shaft 175 which is transversely disposed within the housing 167. The shaft 175 is powered for rotation by means of chain 176 which is mounted about sprocket 176A on the outer end of shaft 175 and sprocket 177 which is affixed to rotatable shaft 178 which is caused to rotate in the direction of arrow 112A through conventional chain and sprocket connections to drive shaft 145. A plurality of flexible picking cylinder spring teeth 179 are mounted on bars 180 spaced about the outer periphery of picking cylinder head 174.

A perforate picking cylinder screen 181, comprised of first arcuate segment 181A and second arcuate segment 181B, is disposed beneath the cylinder head 174, the center of curvature of the screen 181 coinciding with the axis of rotation of cylinder head 174. Spring teeth 182 project upwardly through the first arcuate screen segment 181A to be engaged by teeth 179 on cylinder head 174. A flat feed plate 183 downwardly slopes from the housing 167 and is connected to the top of first arcuate segment 181A. A plurality of pins 184 extend upwardly from arcuate segment 181. The perforations of arcuate segment 181A are of sufficient size to allow dirt but not peanuts to fall therethrough. The perforations of segment 181B are of sufficient size to allow the peanuts to fall therethrough onto continuous belt 185, the upward flight of which moves in the direction of arrow 186. The belt 185 is supported around pulleys 187, 188 mounted on rotatable shafts 189, 190. The flexible peanut guide 191 is secured about its top to mounting flange 192 which depends from the bottom of screen 181.

D. RAKING SECTION

The raking section 113 is disposed rearwardly of the picking section 112 and includes an endless chain 193, similar in construction to the chain 140 shown in FIG. 6, mounted on drive sprocket 196S and sprocket 195. Sprocket 196S is secured onto rotatable shaft 196 which powered through conventional gear mechanisms (not shown); the sprocket 195 is mounted on rotatable shaft 197. A plurality of picking rake fingers 198 are staggered about the chain 193 by means of mounting brackets 194 which are secured on chain 193. The chain 193 is powered to move in the direction of arrow 113A through conventional chain and sprocket connections between drive shaft 145 and rotable shaft 196.

A rake bed 199 is disposed beneath the raking section 113 and comprises a plurality of spaced, longitudinal, parallel, horizontally disposed concrete reinforcing rods 200 which overly a plurality of spaced, transverse, parallel, horizontally disposed concrete reinforcing rods 201. The rods 200, 201 form rectangular openings to allow the peanuts to fall into the shaker section 114.

E. SHAKER SECTION

The shaker section 114 includes an upper shaker frame 202 which connected to upper rocker arms 203, 204 at points A, the arms 203, 204 operable to pivot about points B. A fore and aft reciprocating motion is imparted to frame 202 by means of connecting rod 205 which has one end connected to frame 202 by means of pin 206 and its other end threadedly received within turnbuckle 207 which also receives therein the threaded end of connecting rod 208. The other end of rod 208 is mounted on eccentric 209 which is mounted on eccentric drive shaft 210, and is driven by drive shaft 145 through conventional chain and sprocket connections.

A peanut deflecting shield 211 is secured to the inner wall of housing 167 about the top side wall of upper shaker frame 202 to help deflect peanuts dropping from rake bed 199 and the top of belt 185 into the upper shaker bed 212. A rubber belting mount 213 cushions the upper shaker frame 202 from the shield during the oscillating movements of the frame 202.

A peanut shaker conveyor 214 is formed on the bottom of frame 202, the conveyor 214 having a stepped configuration in cross-section. An open end 215 is provided at the rear of the frame 202 to allow the peanuts to fall on to and through screen 216 horizontally disposed across the lower shaker frame 217.

Lower shaker frame 217 is mounted for reciprocal movement by means of lower rocker arms 218 and 219 which are connected to frame 217 at points C and are pivotable about points D. Lower rocker arm 218 is operably connected to upper rocker arm 203 through link 220. The lower shaker frame 217 is provided along its bottom surface to the stemmer saw section 115 with an arcuate dirt screen 221. A chute 222 is provided at the bottom of lower shaker frame 217 to receive the peanuts as they pass through stemmer saw section 115.

F. STEMMER SAW SECTION

The stemmer saw section 115 includes a plurality of spaced, longitudinally disposed, parallel, upstanding stemmer saws 223 mounted on shaft 224 which is secured in mount 225 that is affixed to the bottom of combine housing 167. The saws 223 are positioned within a stemmer saw rack 226. The top of the saws 223 project upwardly through the bottom of lower shaker frame 217. The saws 223 are rotating in a counter clockwise direction as viewed in FIG. 7. Transversely disposed along the forward portion of rack 226 is a saw tooth cleaner 226A comprised of a piece of nylon approximately ⅛-174 inch thick which engages the teeth of the saws 223. The saw teeth are thereby constantly being cleaned as they rotate.

A cleaning fan assembly 227 is provided to direct a current of air upwardly and rearwardly through the lower shaker frame 217 to dislodge lighter trash elements out of the open rear of the combine. The assembly 227 comprises a cleaning fan rotor 228 having vanes 229 mounted thereon, the rotor 228 being secured to rotatable fan shaft 230. The fan housing 231 has a rearwardly directed discharge conduit 232.

Referring to FIG. 4, the chute 222 is in communication with a conduit 233 which upwardly extends on the outside of housing 167. Conduit section 234 which extends from rotary blower housing 235 is in communication with conduit 233 which combine to form pneumatic elevator section 236 which extends into peanut hopper 116 mounted on the top of housing 167.

IV. OPERATION OF GREEN PEANUT COMBINE

The combine 100 is connected to a tractor by means of a pin being inserted in eyes 134 to secure plates 133 to the tractor hitch and the power take off shaft 137 is operatively connected to the tractor. The combine 100 is positioned over the peanut rows so the blade projections 119 are disposed in the ground beneath the implanted peanuts. A conventional depth gauge wheel may be utilized to obtain the desired soil penetration. As the combine 100 moves forwardly the blade 117 uproots the peanuts which are held together in clumps of soil. An advantage of the present invention is that the soil clinging around the uprooted peanuts is not caked-on as with windrowed peanuts and, thus, the removal of the dirt is easier.

The peanuts pass over the top surface of blade 117 onto belting 123. The width of the belting 123 is such that it extends into the conveyor 111 where it is engaged and flipped upwardly to position 123A by each succeeding plate 157 as that plate 157 begins its upward flight. In that manner, the peanuts are removed from the belting 123 and are transferred to lie on top of a screen 158 as that screen 158 assumes its operative position. The height of the plates 157 help maintain the peanuts that land on a particular screen 158 from bouncing off the conveyor 111.

As the conveyor 111 moves along its upper flight, the opposed shafts 152 with their respective weights 156 are rotating about their longitudinal axes which shakes the channel members up and down and side to side. That oscillating movement is imparted to the chains 140 through paper flanges 151, thereby causing the screens 158 to also shake. The jolting movement imparted to the screens 158 and plates 157 jars the clumps of soil loose from the peanut. The loosened soil drops downwardly through the holes in screens 158 as the conveyor continues its upward flight. The dirt falls through the spaces 163 onto the ground. The pivoting of the screens 148 about shafts 159 to their respective inoperative positions during the lower flight of conveyor 111 insures that no dirt will accumulate on the conveyor 111.

As the peanuts go over the upper discharge end of conveyor 111, the pivoting of the screens 158 to their inoperative positions also insures that all of the peanuts will be dumped into the main combine along arrow 173. The deflecting members 164 keep the peanuts, which by that point have been thoroughly loosened from their surrounding soil clumps, from being bounced upwardly and off conveyor 111 onto the ground.

When the peanuts enter the picking section 112, they are engaged by fingers 179 on rotating picking cylinder head 174 and fingers 182 of arcuate screen section 181A which causes the dirt to fall through section 181A. The peanuts travel along the screen 181 to section 181B where dirt is further removed from the nuts by the meshing of fingers 179 and pins 184. Some of the peanuts fall through section 181B onto moving belt 185, the guide 191 aiding in directing the falling peanuts onto the belt 185.

The peanuts that do not fall through section 181B are transferred to the raking section 113 where the action on the peanuts of the rake fingers 198 and the rough, textured surface of rods 200 and 201 of rake bed 199 further cleans the nuts. The stems are swept through the open rear of the housing 167 by the rotation of the rake chain 193 and fingers 198. The peanuts fall through rake bed 199 onto the upper shaker bed 212 which is being reciprocally moved about pivot points B. The peanuts falling from the upper discharge end of belt 185 also land on upper shaker bed 212. The shield 211 helps to deflect the falling peanuts onto the bed 212.

The nuts fall through bed 212 onto lower shaker bed 214 where, by the reciprocal movement also being imparted to that bed 214, the nuts "walk" to end 215 where they fall through screen 216 and into the stemmer saw section 115. The saws 223 cut the stems from the peanut hulls. The cleaning fan 227 directs air through the lower shaker frame 217 to send the severed stems and out of the open rear of the combine.

The nuts fall into chute 222 where they are drawn upwardly through chute 233 by air being supplied through chute 234 from blower 235 producing a suction through chute 233 by venturi action. The cleaned peanuts are entrained by the current of air to the hopper 116 through chute 236. The pneumatic delivery of the nuts to hopper 116 helps reduce the bursting of the peanut pods. The nuts can then be taken from hopper 116, dried and sacked.

What I claim is:

1. In a method of harvesting peanuts from their growing implacement in a row in the ground wherein the exposed peanut vines are severed from the implanted peanuts, said severed vines are removed from the row, the implanted peanuts are dug from their growing implacement in the ground, and the freshly dug peanuts are delivered into a combine means wherein the peanuts are cleaned for drying, the improvement comprising: in the delivery step, the steps of conveying said freshly dug peanuts along an upwardly inclined path and simultaneously imparting side-to-side and up-and-down movement to said path which shakes said peanuts in a lateral direction and jars said peanuts in an upwardly direction, thereby causing the dirt to be removed from the peanuts.

2. A method as claimed in claim 1 wherein the removing step includes the steps of conveying said severed vines along an upwardly inclined path and directing high velocity air longitudinally over said path so as to blow said severed vines from said path into a storage container.

3. A method as claimed in claim 1 wherein the severing step includes the step of lifting the vines from the ground into engagement with a set of opposed blades.

4. A method as claimed in claim 3 including the step of reciprocating a selected one of said blades.

5. A method as claimed in claim 1 wherein said imparting step includes the rotating of a shaft longitudinally mounted on said inclined path, a weight being eccentrically mounted on said shaft.

* * * * *